(12) United States Patent
Fujisawa (10) Patent No.: US 12,218,905 B2
(45) Date of Patent: Feb. 4, 2025

(54) INFORMATION PROCESSING APPARATUS, CONTROL METHOD FOR INFORMATION PROCESSING APPARATUS, AND MEDIUM

(71) Applicant: CANON KABUSHIKI KAISHA, Tokyo (JP)

(72) Inventor: Minoru Fujisawa, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/823,426

(22) Filed: Mar. 19, 2020

(65) Prior Publication Data

US 2020/0314062 A1   Oct. 1, 2020

(30) Foreign Application Priority Data

Mar. 27, 2019   (JP) ................................ 2019-061363

(51) Int. Cl.
*H04L 61/4511* (2022.01)
*G06F 3/12* (2006.01)
(Continued)

(52) U.S. Cl.
CPC ........ *H04L 61/4511* (2022.05); *G06F 3/1203* (2013.01); *G06F 3/1231* (2013.01);
(Continued)

(58) Field of Classification Search
CPC . H04L 61/6068; H04L 61/1511; H04L 69/16; H04L 67/327; H04L 61/251;
(Continued)

(56) References Cited

U.S. PATENT DOCUMENTS 6,064,671 A * 5/2000 Killian .................... H04L 69/18
370/392
7,103,675 B1 * 9/2006 Freedman ............... H04L 69/32
709/227
(Continued)

FOREIGN PATENT DOCUMENTS

JP   2001358762 A   12/2001
JP   2007164680 A   6/2007

OTHER PUBLICATIONS

B. K. Daya et al., "Scorpio: A 36-core research chip demonstrating snoopy coherence on a scalable mesh NoC with in-network ordering," 2014 ACM/IEEE 41st International Symposium on Computer Architecture (ISCA), Minneapolis, MN, USA, 2014, pp. 25-36 (Year: 2014).*

*Primary Examiner* — Taylor A Elfervig
(74) *Attorney, Agent, or Firm* — ROSSI, KIMMS & McDOWELL LLP (57) ABSTRACT

An information processing apparatus with a plurality of network interfaces is provided. The information processing apparatus comprises at least one memory that stores a set of instructions, and at least one processor that executes the instructions to control to receive a request via one of the plurality of networks, generate a response to a source of the received request, the response indicating the source of the request set as a destination address and a destination address of the request set as a source address, and in a case where the network interface having received the request is different from a network interface determined to be used for communication with a destination identified by the destination address set in the generated response, prevent the response from the different network interface.

11 Claims, 4 Drawing Sheets

(51) Int. Cl.
*H04L 69/16* (2022.01)
*H04L 101/668* (2022.01)

(52) U.S. Cl.
CPC ............ *G06F 3/1236* (2013.01); *H04L 69/16* (2013.01); *H04L 2101/668* (2022.05)

(58) Field of Classification Search
CPC ........... H04L 2012/5614; G06F 3/1203; G06F 3/1231; G06F 3/1236
USPC ....................................................... 709/245
See application file for complete search history.

(56) References Cited

U.S. PATENT DOCUMENTS

| | | | | |
|---|---|---|---|---|
| 7,360,245 | B1* | 4/2008 | Ramachandran | ... H04L 63/1466 713/153 |
| 7,505,418 | B1* | 3/2009 | Liang | ...................... H04L 45/00 370/392 |
| 9,806,984 | B1* | 10/2017 | Tolstoy | ................. H04L 45/745 |
| 10,003,524 | B2* | 6/2018 | Li | ........................... H04L 69/16 |
| 10,505,847 | B1* | 12/2019 | Singarayan | ............. H04L 45/54 |
| 2007/0061482 | A1* | 3/2007 | Higuchi | .............. H04L 63/0272 709/238 |
| 2012/0075988 | A1* | 3/2012 | Lu | ........................... H04L 45/28 370/218 |
| 2014/0029617 | A1* | 1/2014 | Wang | ...................... H04L 12/54 370/392 |
| 2017/0222926 | A1* | 8/2017 | Mack-Crane | ........... H04L 45/72 |
| 2018/0191525 | A1* | 7/2018 | Roychoudhury | ... H04L 63/0281 |

* cited by examiner

INFORMATION PROCESSING APPARATUS, CONTROL METHOD FOR INFORMATION PROCESSING APPARATUS, AND MEDIUM

BACKGROUND OF THE INVENTION

Field of the Invention

The present invention relates to, for example, an information processing apparatus connected to a plurality of networks, and in particular relates to communication from the information processing apparatus.

Description of the Related Art

In an office environment that utilizes a device connected to networks, there is generally a case in which gateways are provided in an office and in which IP addresses of different subnet environments are allocated to respective network connection ports of the device to build a plurality of subnet environments for business purposes.

Consider a case in which a communication terminal used as the above-described device supports a plurality of network interfaces and operates on the respective subnet environments. Gateways such as routers are provided for the respective subnet environments, and the communication terminal communicates via any of the gateways depending on the situation (for example, see Japanese Patent Laid-Open No. 2001-358762). In some cases, terminals on different subnets may make requests to the communication terminal via the gateways provided on the respective subnets. In this case, the communication terminal, upon receiving the request, analyzes request details, creates response data, and attempts to transmit the response data to the requesting terminals. At this time, which of the plurality of interfaces of the communication terminal the response data is to be transmitted to is generally determined by network routing processing. In the general routing processing, for the requests from the terminals on the subnets to which the communication terminal is connected, which of the interfaces the response is to be transmitted to can be determined based on a routing table included in the communication terminal.

In contrast, for a request received from another network via a gateway present on the same subnet as that for the communication terminal, the communication terminal transmits a response to a preset default gateway. In other words, one of the gateways connected to the respective plurality of network interfaces is preset as the default gateway. In a case where the communication terminal transmits a response via the default gateway, the response is transmitted from the network interface corresponding to the same subnet as that for the default gateway.

However, even in a case where the gateway is present on each of the subnets, only one of the gateways can be set as the default gateway. Thus, even for a request from a terminal via a gateway different from the default gateway, the communication terminal transmits, to the default gateway, a response to the request. As a result, the response may fail to reach the subnet to which the source terminal of the request is connected. In such a case, in general, setting static routing can command execution of routing pressing for transmission to a particular gateway for a destination terminal holding a particular address.

SUMMARY OF THE INVENTION

The present invention provides a mechanism for an information processing apparatus connected to a plurality of networks, the mechanism transmitting, to an appropriate network, a response to a received request. Another aspect of the present invention provides a mechanism for performing control for preventing a response to a request received via a predetermined interface from being transmitted via an interface different from the predetermined interface.

The present invention has the following configuration.

Specifically, according to one aspect of the present invention, there is provided an information processing apparatus with a plurality of network interfaces, the information processing apparatus comprising: at least one memory that stores a set of instructions; and at least one processor that executes the instructions to control to: receive a request via one of the plurality of networks; generate a response to a source of the received request, the response indicating the source of the request set as a destination address and a destination address of the request set as a source address; and in a case where the network interface having received the request is different from a network interface determined to be used for communication with a destination identified by the destination address set in the generated response, prevent the response from the different network interface.

According to another aspect of the present invention, there is provided a control method for an information processing apparatus with a plurality of network interfaces, the control method comprising controlling to: receive a request via one of the plurality of networks; generate a response to a source of the received request, the response indicating the source of the request set as a destination address and a destination address of the request set as a source address; and in a case where the network interface having received the request is different from a network interface determined to be used for communication with a destination identified by the destination address set in the generated response, prevent the response from the different network interface.

According to still another aspect of the present invention, there is provided a control method for an information processing apparatus with a plurality of network interfaces, the control method comprising controlling to: receive a request via one of the plurality of networks; generate a response to a source of the received request, the response indicating the source of the request set as a destination address and a destination address of the request set as a source address; and identify a network interface having received the request and transmit the response via the identified network interface.

In the information processing apparatus connected to the plurality of networks, the response to the received request can be transmitted to the appropriate network. Additionally, according to the present invention, control is performed for preventing the response to the request received via the predetermined interface from being transmitted via an interface different from the predetermined interface. As a result, security can be improved.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

For a terminal or the like including no user interface allowing static routing to be set, a user has difficulty specifying conditions using the static routing. Additionally, even in a case where the user can set the static routing, the user often has difficulty defining all the conditions without omission using the static routing in a case where, for example, the user does not have detailed knowledge of network technology and environments or a large number of terminals are present for which settings are to be made.

In such cases, setting is difficult and erroneous setting or setting omission may occur. As a result, data may be transmitted through a communication path unintended by the user. As a result of an error in static routing setting or the like, a communication terminal may transmit response data to a default gateway belonging to a subnet different from a subnet to which an interface having received a request corresponding to the response belongs.

In a today's office environment, in some cases, security is emphasized. For example, in some cases, in order to properly protect personal information collected from individuals, a public institution uses a network system in which subnets are established such that the personal information is handled only in a particular subnet.

Additionally, for companies emphasizing security, a system has been conceived that includes communication packet monitoring apparatuses arranged for the respective subnets, and in a case where the monitoring apparatus detects an illicit packet, picks up a source communication terminal as a malicious terminal, and automatically disconnects the picked-up terminal from the subnet.

In each of the embodiments described below, an information processing apparatus is provided that includes a function of suppressing transmission of data through a communication path unintended by the user due to erroneous setting or setting omission.

This mechanism may indicate of possible occurrence of a security problem such as transmission of collected personal information to a network of an unintended subnet or a failure such as disconnection of a terminal due to automatic disconnection.

First Embodiment

Figure 1:
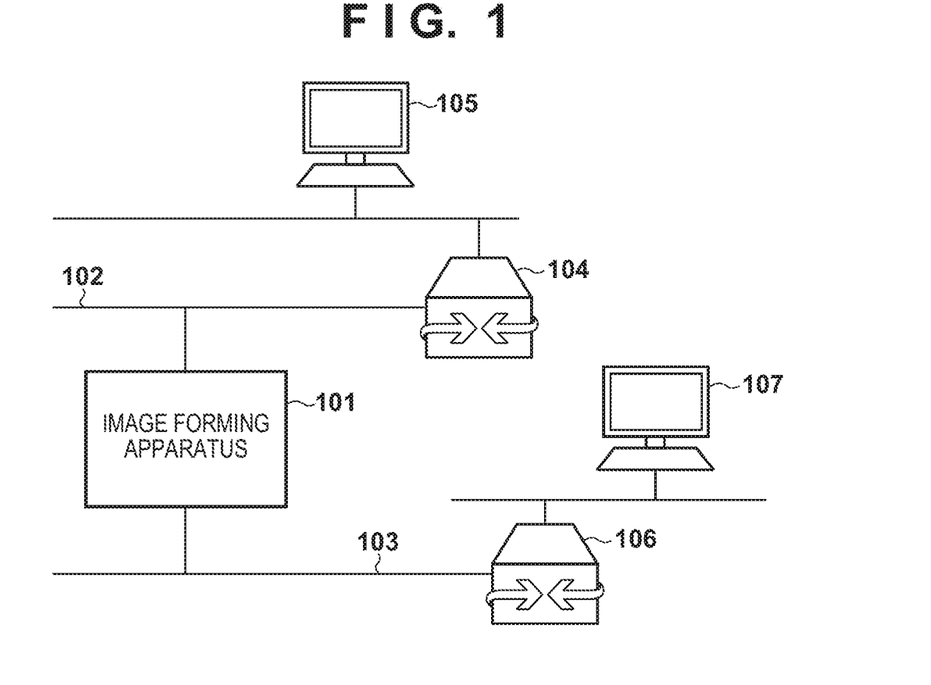
FIG. 1 is a diagram illustrating a network configuration.

FIG. 1 is an overall view of a network including an image forming apparatus 101. The image forming apparatus 101 is connected to a plurality of networks 102 and 103. In a network configuration on the network 102 side, a terminal 105 such as a PC and the image forming apparatus 101, which is an example of an information processing apparatus, can be connected together via the network 102 and a gateway 104. Additionally, in the network configuration, a terminal 107 such as a PC and the image forming apparatus 101 can be connected together via the network 103 and a gateway 106. Examples of such a network configuration may be common e.g., in a medium-or-large-scale office environment in a case where a plurality of different subnet environments are established for business purposes. The network of the present embodiment does not have a particularly limited physical configuration, but is based on an IP network, and packets as used herein refer to IP packets.

Hardware of Image Forming Apparatus

Figure 2:
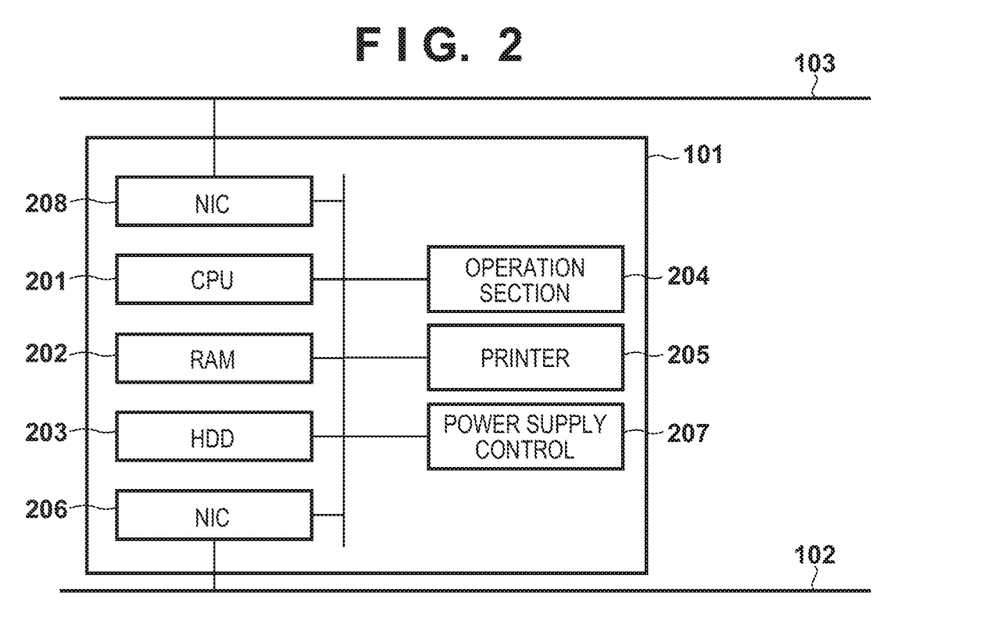
FIG. 2 is a block diagram illustrating a hardware configuration of an image forming apparatus 101.

FIG. 2 is a block diagram illustrating a hardware configuration of the image forming apparatus 101. A printer 101 is connected to the networks 102 and 103 via a network interface card (NIC) 206 and an NIC 208, respectively. The NIC is also referred to as a network interface. A Central Processing Unit (CPU) 201 executes a software program for the image forming apparatus 101 to control the overall apparatus. A RAM 202 is a random access memory, and is used for temporary data storage, various types of task processing after activation of firmware for the apparatus, and the like when CPU 201 controls the apparatus. The RAM 202 may store programs for implementing procedures executed by CPU 201 and illustrated in FIGS. 6, 8, and 9 described below. An HDD 203 is a storage, and is used for such purposes as storage of various setting values for the image forming apparatus 101 and spooling of print data. An operation section 204 includes a liquid crystal panel, causes the liquid crystal panel to display various operation screens, and transmits, to the CPU 201, commands input via the operation screens. A print engine 205 prints an image based on image data on a recording medium. During printing, the print engine 205 performs image processing, such as color conversion, filter processing, resolution conversion, or the like, on the print data.

The NIC 206 connects to the network 102 and the NIC 208 connects to the network 103 to control data communication with external apparatuses (terminals 105 and 107) on the respective networks. Note that, in the present embodiment, the interface configuration includes the two NICs but that an interface including three or more NICs may be used. Additionally, each of the NICs 206 and 208 may correspond to a wired network or a wireless network, and for example, the NIC 206 for a wired network interface may be combined with the NIC 208 for a wireless network interface. A power supply control 207 is a power supply apparatus for the printer 101. The power supply control 207 turns on/off a power supply and performs energization control during sleep.

Software of Image Forming Apparatus

Figure 3:
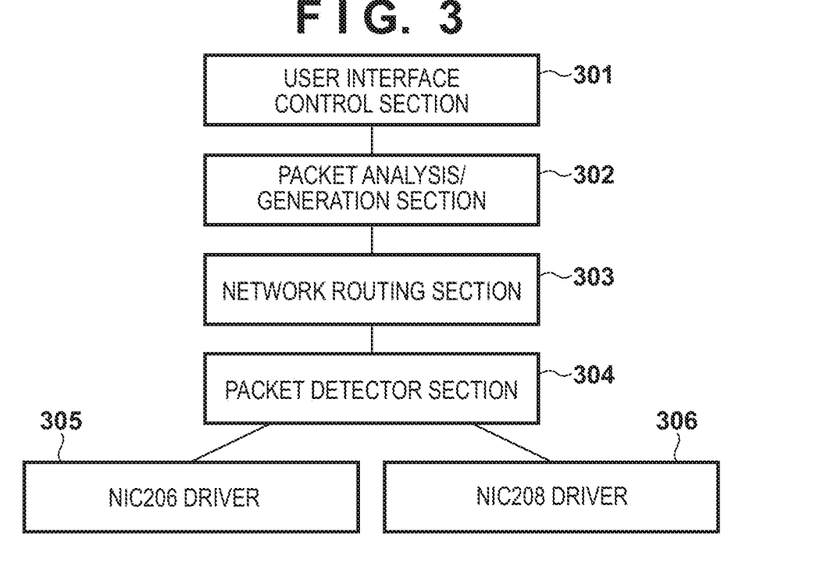
FIG. 3 is a diagram illustrating a software configuration of the image forming apparatus 101.

FIG. 3 is a diagram illustrating a configuration of software controlled by the CPU 201 in the image forming apparatus 101. FIG. 3 illustrates a configuration for communication control, and other components such as applications are omitted. A user interface control section 301 controls the operation section 204 to display messages and to receive external inputs from the user. The image forming apparatus 101 receives a request packet from the terminal 105, and a packet analysis/generation section 302 analyzes the contents of the request packet and generates a response packet corresponding to the request packet. The packet analysis/generation section 302 also includes the role of a transmission control protocol/Internet protocol (TCP/IP protocol) stack that is generally referred to.

A network routing section 303 controls routing regarding which of the NICs 206 and 208 is used by a network packet transmitted from the image forming apparatus 101 to reach the gateway 104 or 106, or external terminal 105 or 107. In routing, the network routing section 303 uses a routing table holding a routing list for network communication. By utilizing the routing table, the network routing section 303 transmits a network packet to a driver 305 for the NIC 206 in a case of transmitting a response packet from the NIC 206 to the network 102. Additionally, by utilizing the routing table, the network routing section 303 transmits a network packet to a driver 306 for the NIC 208 in a case of transmitting a response packet from the NIC 208 to the network 103.

A packet detector section 304 checks the response packet corresponding to the received request packet and determines whether the network interface to transmit the response packet determined in the processing of the network routing section 303 is correct. The packet detector section 304 monitors all of the packets transmitted from the network interface of one of the NIC 206 and NIC 208 by the network routing section 303, and determines whether the network interface is correct.

The NIC 206 driver 305 and the NIC 208 driver 306 are driver software and control the NIC 206 and 208, respectively. The NIC 206 driver 305 and the NIC 208 driver 306 control the individual NICs for processing for transmission and reception to and from the networks 102 and 103, respectively.

Packet Configuration Example

Figure 4:
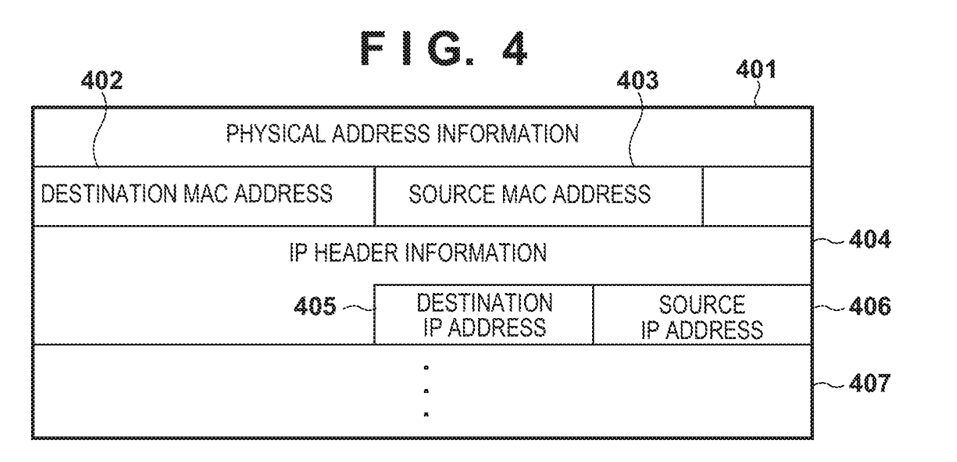
FIG. 4 is a diagram illustrating an example of a network packet in which the image forming apparatus 101 receives a request and makes a response.

FIG. 4 is a configuration example of a format communication packet indicating destination and source address information included in a header of a request packet or a response packet. A physical address information 401 is a field indicating physical address information regarding each of the source terminal and the destination terminal, and includes a destination Medium Access Control (MAC) address 402 and a source MAC address 403.

For example, in a case where a request packet is transmitted from the terminal 105 to the image forming apparatus 101, the destination MAC address 402 of a packet generated by the terminal 105 is the MAC address of the network interface included in the network interfaces of the gateway 104 and corresponding to the same network as that for the terminal 105. Additionally, the source MAC address 403 is the MAC address held by the terminal 105. In this manner, the MAC address of the network interface used as a source in one network is recorded at the source MAC address, and the MAC address of the network interface used as a destination in the network is recorded at the destination MAC address. Each time these addresses are transferred to a different network via a router or the like, these addresses are rewritten to MAC addresses for the network.

On the other hand, in a case where the response packet corresponding to the request packet is transmitted from the image forming apparatus 101 to the terminal 105, the destination MAC address 402 of the packet generated by the image forming apparatus 101 is the MAC address of the network interface included in the network interfaces of the gateway 104 and corresponding to the network 102. Additionally, the source MAC address 403 is the MAC address allocated to the NIC 208.

An IP header information 404 is a field indicating the IP addresses of the source and the destination, and includes a destination IP address 405 and a source IP address 406. In a case where the request packet is transmitted from the terminal 105 to the image forming apparatus 101, the destination IP address 405 of the packet generated by the terminal 105 is the IP address allocated to the network interface on the NIC 208 side of the image forming apparatus 101. Additionally, the source IP address 406 is the IP address assigned to the terminal 105.

On the other hand, in a case where the response packet corresponding to the request packet is transmitted from the image forming apparatus 101 to the terminal 105, the destination IP address 402 of the packet generated by the image forming apparatus 101 is the IP address allocated to the terminal 105. Additionally, the source IP address 403 is the IP address allocated to the NIC 208 side network interface.

A data unit 407 includes a data unit conforming to a higher layer protocol in the IP, etc. For example, types including the request packet, the response packet, and the like, and various corresponding data are included. For example, in a case where the higher layer is HTTP, the data unit 407 includes a port number indicating that the higher layer is HTTP, a browsing request for Web information and a response to the request, a printing request such as LPD, print data, and the like.

Routing Table

Figure 5:
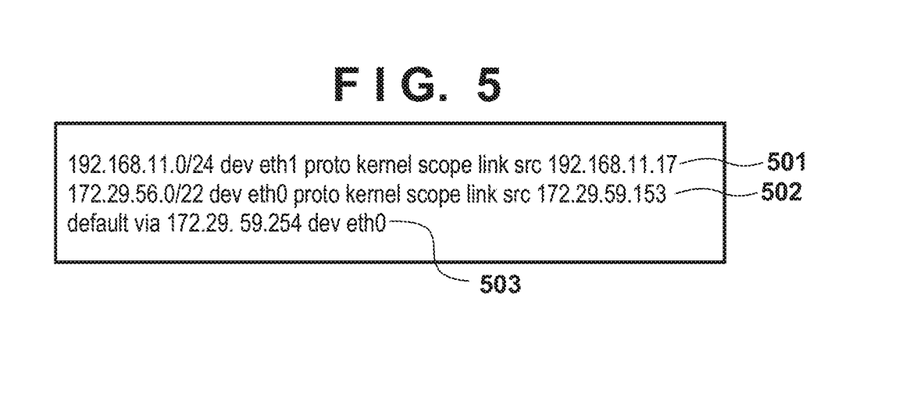
FIG. 5 is a diagram illustrating an example of a routing list for network routing for the image forming apparatus 101.

FIG. 5 is an example of a routing table holding a routing list used by the network routing section 303 in controlling routing. For example, routing information 501 indicates a communication path to the network 102 side. At the beginning of the routing information 501, "192.168.11.0/24" indicates the network address and subnet mask of the network 102. "eth1" indicates a network interface connected to a network with the address "192.168.11.0/24", that is, a network interface name on the NIC 206 side. "src 192.168.11.17" indicates a network interface with the name "eth1", that is, the IP address of the network interface on the NIC 206 side. Thus, the network routing section 303 may determine to send, to the NIC 206 side, packets to be transmitted to the terminal in the network 102.

Additionally, routing information 502 indicates a communication path to the network 103 side. As with the routing information 501, "172.29.56.0/22" indicates the network address and subnet mask of the network 103. "eth0" indicates a network interface connecting to a network with the address "172.29.56.0/22", that is, a network interface name on the NIC 208 side. "src 172.29.59.153" indicates a network interface with the name "eth0", that is, the IP address of the network interface on the NIC 208 side. Thus, the network routing section 303 may determine to send, to the NIC 208 side, packets to be transmitted to the terminal in the network 103.

Routing information 503 indicates a path used in a case where the image forming apparatus 101 sets a default gateway. For example, in a case where the default gateway is the gateway 106, "172.29.59.254" indicates the IP address of the gateway 106. The routing setting in the routing information 503 sets the gateway 106 as the default gateway and, thus, the network routing section 303 may determine to transmit data to the NIC 208 side with the same network 103 as that of the default gateway for transmission to the default gateway. Note that the network can be identified by masking the IP address with the subnet mask.

In general, the default gateway is required to communicate with the terminal 107 on the network different from the networks 102 and 103 to which the image forming apparatus 101 is directly connected, as set in the routing information 501 and the routing information 502. In order to communicate with the terminal 107, the network routing section 303 performs processing of determining a path from the IP address of the terminal 107. In a case where the image forming apparatus 101 supports a plurality of network interfaces and where the IP address of the terminal 107 does not match any of the subnet addresses of the networks 102 and 103, the network routing section 303 fails to determine which of the interfaces is used for communication. At this time, the network routing section 303 communicates with the gateway 106, used as the default gateway.

Here, consider a case in which the terminal 105 transmits a request packet to the image forming apparatus 101. Like the terminal 107, the terminal 105 is connected to the network different from the network 102 and 103, and thus the network routing section 303 determines to transmit response data to the gateway 106, used as the default gateway. As a result, a response packet corresponding to the request packet is transmitted to the network 103, the request packet having been transmitted to the image forming apparatus 101 via the gateway 104 by the terminal 105. This may lead to a security problem such as information leakage. To prevent such a situation, the image forming apparatus 101 of the present embodiment executes processing described below.

Filtering of Response Packet

Figure 6:
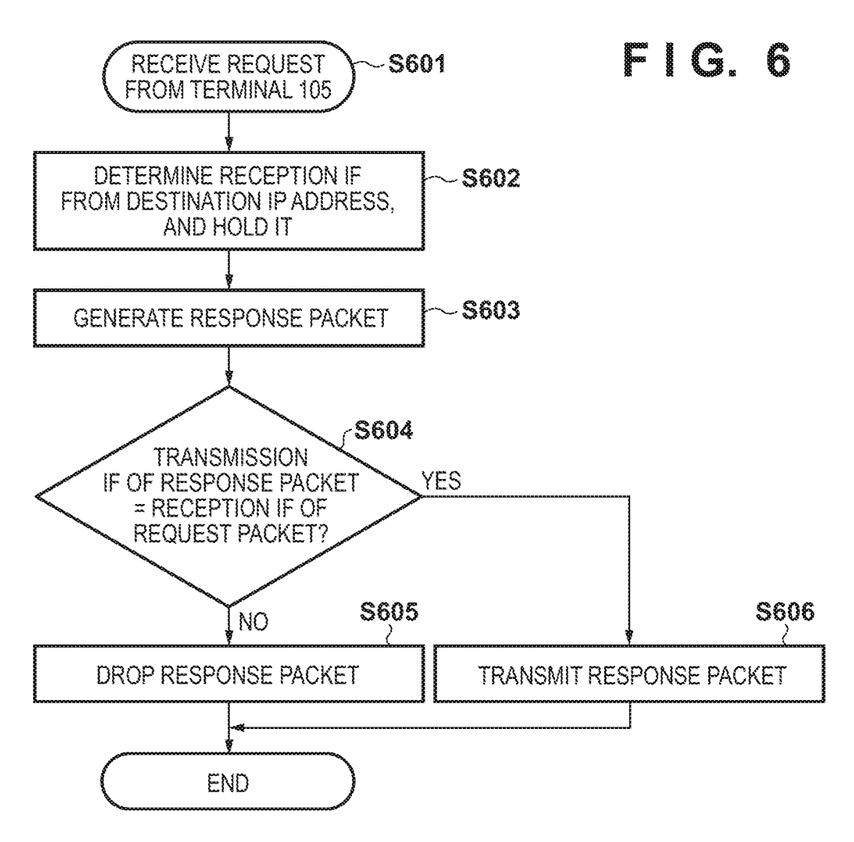
FIG. 6 is a diagram of a processing flow performed when the image forming apparatus 101 receives a request.

FIG. 6 is a diagram illustrating a processing flow of prevention of transmission of a response packet from an inappropriate network interface in order to prevent the possibility of leading to a security problem such as information leakage. A procedure in FIG. 6 can be realized, for example, by CPU 201 executing a program. In other words, FIG. 6 illustrates a processing procedure for the program.

In a case where the image forming apparatus 101 receives a request packet from the terminal 105 at S601, one of the packet analysis/generation section 302 and the packet detector section 304 determines, at S602, which of the network addresses of the networks 102 and 103 matches with the network address included in the destination IP address 405 of the packet. Thus, which of the interfaces in the NICs 206 and 208 the request packet has been received from is identified, and information indicating the identified network interface (referred to as interface information) is held. The interface information may be, for example, a network address included in the destination IP address 405 of the received request packet. Alternatively, the interface information may be the name, IP address, MAC address, or the like of the corresponding interface of the image forming apparatus 101.

Once the packet analysis/generation section 302 holds the interface information identifying the network interface on the request packet receiving side, the packet analysis/generation section 302 notifies the packet detector section 304 of the interface information indicating the identified network interface. The notification is performed by one of the methods including, for example, message notification, writing to a shared resource such as a file, and referencing.

At S603, the packet analysis/generation section 302 generates a response packet corresponding to response data for the request packet. At this time, the packet analysis/generation section 302 sets, in the destination IP address 405 of the response packet, the IP address set in the source IP address 406 of the request packet. Additionally, the packet analysis/generation section 302 also sets, in the source IP address 406 of the response packet, the IP address set in the destination IP address 405 of the request packet. In other words, the response packet is generated by replacement with the source IP address and the destination IP address of the request packet. Subsequently, the packet analysis/generation section 302 transmits the generated response packet to the network routing section 303.

The network routing section 303 determines a network interface for transmission of the response packet based on the destination IP address 405 of the response packet and the routing table. As an example, a case will be described in which, for example, the destination IP address 405 of the response packet for the packet received via the NIC 208 is "172.25.1.100". This case does not satisfy the conditions in 501 and 502 illustrated in FIG. 5. In this case, the network routing section 303 determines to send the response packet to the NIC 206 in order to transmit the response packet to the gateway 106, used as the default gateway. The network routing section 303 attempts to transmit the response packet to the determined NIC 206. In this way, the interface used by the apparatus to receive the packet does not necessarily match the interface determined to be the destination.

At S604, the packet detector section 304 checks whether the response packet transmitted by the network routing section 303 to the NIC 206 has been sent to the correct interface. For the check, the packet detector section 304 references the interface information identified by the packet analysis/generation section 302 at S602 and passed to the packet detector section 304. The packet detector section 304 then determines whether the network interface used as the source of the response packet matches the network interface identified by the interface information checked at S602. In a case of determining a match, the packet detector section 304 determines, at S606, that the source of the response packet is the correct interface, that is, the destination is the correct network and ends the processing. At this time, the response packet is transmitted from the interface to which the response packet has been passed. The present embodiment corresponds to a case where the source of the response packet is the NIC 208. This prevents transmission of the response packet to the network 102, leading to information leakage to the network 103.

At S604, in a case where the network interface for transmitting the response packet does not match the network interface identified at S602, then at S605, the packet detector section 304 determines that the source of the response packet is the wrong interface and discards the response packet. At this time, the packet detector section 304 stores information regarding the discarded packet as a discarded packet list. This prevents information leakage to the subnet 103 side.

Discarded Packet List

Figure 7:
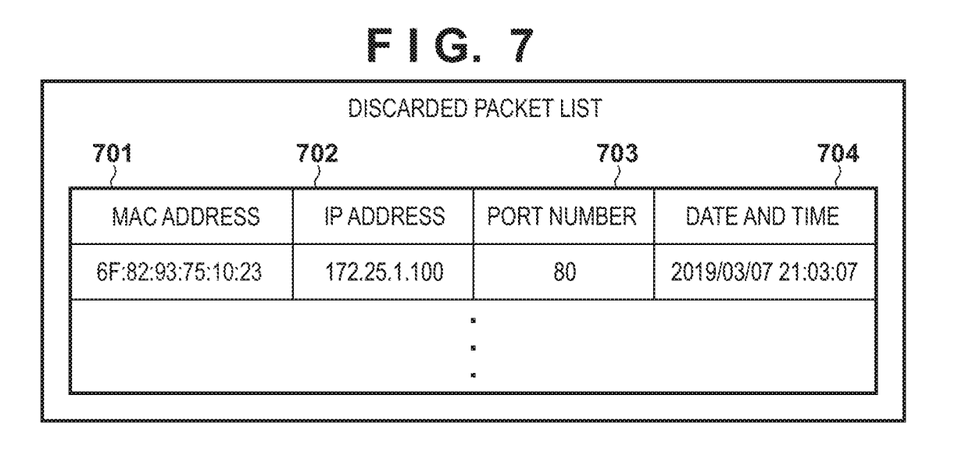
FIG. 7 is an example of a user interface displaying packets discarded by the image forming apparatus 101.

FIG. 7 is an example of a list of information regarding the packet discarded in the description of FIG. 6. In a case where the packet detector section 304 discards the response packet at S605, the user interface control section 301 displays the information regarding the discarded packet on the operation section 204 based on the discard packet list stored at S605. In displaying the discarded packet, the user interface control section 301 acquires history information (discarded packet list) regarding the discarded packet from the packet detector section 304. The acquisition is performed by one of the methods including passage of a message, a command, or the like, and referencing of information in a shared resource or a file.

In FIG. 7, a MAC address 701 indicates the destination MAC address 402 of the discarded response packet. An IP address 702 indicates the destination IP address 405 of the discarded response packet. A port number 703 indicates a source port number of the discarded response packet. The port number 703 is generally stored in the data unit 407. A date and time 704 indicates the date and time at which the packet detector section 304 actually discarded the response packet. In this way, the discarded packet can be presented to the user and the user can learn the information regarding the discarded packet. Note that the source address is not recorded because it is evident that the source is the image forming apparatus 101 and that the packet was transmitted from the network interface to which the default gateway is not connected.

The mechanism as described above allows prevention of transmission of packets from an inappropriate network interface. Thus, the possibility of information leakage may be prevented even in a case where leakage or an error is involved in setting of static routing. Additionally, a situation can be prevented in which the destination device of a packet transmitted from an inappropriate network interface is disconnected from the network.

Second Embodiment

Figure 8:
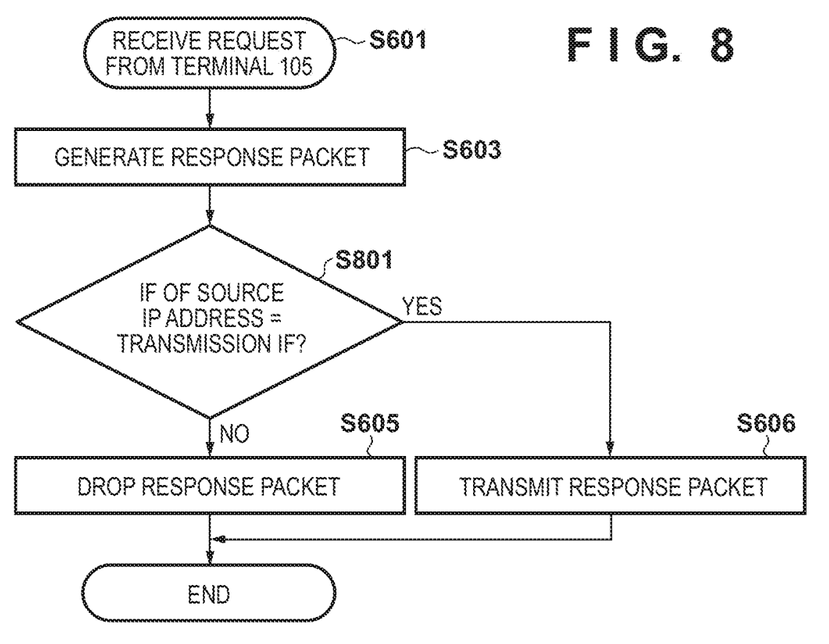
FIG. 8 is a diagram of processing flow performed when the image forming apparatus 101 receives a request, the diagram being different from FIG. 6.

Now, a second embodiment will be described focusing on portions different from the corresponding portions of the first embodiment. FIG. 8 is an example of a procedure partially different from the flow described with reference to FIG. 6. The processing contents of S601, S603, S605, and S606 are the same as the processing contents described with reference to FIG. 6 and are thus omitted. The present embodiment is the same as the first embodiment except that the procedure in FIG. 5 is replaced with the procedure in FIG. 6.

Unlike in the flow in FIG. 6, the processing at S603 is performed without execution of the processing at S602. In the flow in FIG. 6, the processing at S602 is performed when the image forming apparatus 101 receives a request packet. However, the present embodiment omits the processing performed when a request packet is received. Then, a response packet corresponding to the request packet is generated, and the processing proceeds to S801.

At S801, the packet detector section 304 checks whether the response packet transmitted to the NIC 206 by the network routing section 303 has been sent to the correct interface. For the check, the packet detector section 304 references the source IP address 406 of the response packet. The packet detector section 304 checks whether the source IP address 406 matches the IP address allocated to NIC 206. In a case where the IP addresses match, then at S606, the packet detector section 304 determines that the destination of the response packet is the correct interface. This prevents transmission of the response packet to the network 102, leading to information leakage to the network 103.

In a case where the result of the check at S801 indicates that the IP addresses do not match, then at S605, the packet detector section 304 determines that the source of the response packet is the wrong interface and discards the response packet. This prevents information leakage to the subnet 103 side.

Storage of the discarded packet list and information display for the list in the present embodiment are the same as those described with reference to FIG. 7 and are thus omitted.

In the first and second embodiments described above, the response packet is discarded at the timing before the image forming apparatus 101 transmits the response packet. Accordingly, packets can be discarded without execution of complicated control such as edition of information in the response packet or a dynamic change in routing processing. Thus, the possibility of information leakage may be prevented by relatively easy processing.

Third Embodiment

Figure 9:
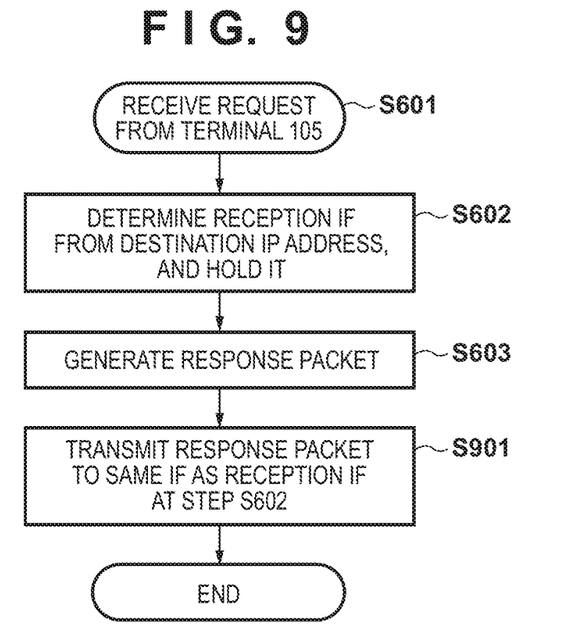
FIG. 9 is a diagram of processing flow performed when the image forming apparatus 101 receives a request, the diagram being different from FIG. 6 and FIG. 8.

In the first and second embodiments, the method for discarding packets to be transmitted from a network interface inappropriate for the destination has been described. In the third embodiment, a network interface having received a request packet is identified and control is performed for transmitting a response packet from the network interface. A mechanism will be described in which the above-described control is performed for transmitting packets from a network interface appropriate for the destination. Hereinafter, a difference from the first embodiment and the second embodiment will be described. The difference is that FIG. 5 or FIG. 6 is replaced with a procedure in FIG. 9. FIG. 9 is an example of a procedure partially different from the flow described with reference to FIG. 6. The difference between the flow in FIGS. 6 and 8 is in that a network interface having received a request packet is identified based on a request packet and that a response packet is transmitted from the same network interface as that has received the request packet. The processing contents of S601, S602, and S603 are the same as those described with reference to FIG. 6 and are thus omitted.

A difference from the flow in FIG. 6 is that, after the packet analysis/generation section 302 generates a response packet at S603, at least one of the packet analysis/generation section 302 and the packet detector section 304 transmits, at S901, the response packet to the interface having received the request packet at S602. This prevents possible information leakage to the subnet 103 side, and unlike in FIG. 6 and FIG. 8, the response packet can be transmitted to the terminal 105.

As is the case with the first embodiment and the second embodiment, the above-described flow can prevent packets from being transmitted from a network interface inappropriate for the destination. This allows prevention of the possibility of information leakage. Furthermore, in the present embodiment, packets can be transmitted from a network interface appropriate for the destination. Thus, no packet is discarded immediately before transmission, and efficient communication may be performed. In particular, in a case where the response packet is discarded, the source terminal of the request packet needs to wait until a response standby time expires. This can be prevented by the present embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-061363, filed Mar. 27, 2019 which is hereby incorporated by reference herein in its entirety.

What is claimed is:

1. An information processing apparatus with a plurality of network interfaces, the information processing apparatus comprising:
at least one memory that stores a set of instructions; and
at least one processor that executes the instructions to control to:
receive a request via one of the plurality of networks;
generate a response to a source of the received request, the response indicating the source of the request set as a destination address and a destination address of the request set as a source address;
send the response, only to the source of the received request, by a network interface determined based on a routing table in a case where the network interface determined based on the routing table to send the generated response matches a network interface by which the request has been received; and
discard the response not to send the generated response, only to the source of the received request, by the network interface determined based on the routing table in a case where the network interface determined based on the routing table to send the generated response does not match the network interface by which the request has been received.

2. A control method for an information processing apparatus with a plurality of network interfaces,
the control method comprising controlling to:
receive a request via one of the plurality of networks;
generate a response to a source of the received request, the response indicating the source of the request set as a destination address and a destination address of the request set as a source address;
send the response, only to the source of the received request by a network interface determined based on a routing table in a case where the network interface determined based on the routing table to send the generated response matches a network interface by which the request has been received; and
discard the response not to send the generated response, only to the source of the received request by the network interface determined based on the routing table in a case where the network interface determined based on the routing table to send the generated response does not match the network interface by which the request has been received.

3. The control method according to claim 2, wherein the method further comprising controlling to:
determine whether or not the network interface determined based on the routing table to send the generated response matches the network interface by which the request has been received, wherein
the response is sent by the network interface determined based on a routing table in a case where it is determined that the network interface determined based on the routing table to send the generated response matches a network interface by which the request has been received; and
the response is discarded not to send the generated response by the network interface determined based on the routing table in a case where it is determined that the network interface determined based on the routing table to send the generated response does not match the network interface by which the request has been received.

4. The control method according to claim 2, wherein the information processing apparatus is a printing apparatus including a printing unit.

5. The control method according to claim 2, wherein the method further comprising:
controlling to notify a user of predetermined information in a case where the response is discarded.

6. The control method according to claim 2, wherein
the response is an Internet Protocol (IP) response packet, and
the destination address is an IP address corresponding to the source.

7. The control method according to claim 2, wherein the plurality of network interfaces are connected to different networks.

8. The control method according to claim 2, wherein the method further comprising:
identifying a network interface that received the request, based on a network address of the destination of the request,
wherein the stored information is a name of the identified network interface.

9. The control method according to claim 2 further comprising:
store information corresponding to a network interface used to receive the request which is identified based on a destination of the request; and
compare a network interface used to receive the request and identified based on the stored information with the network interface determined to be used for communication with the destination included in the response to determine whether the network interface having received the request is different from the network interface determined to be used for communication with the destination identified by the destination address set in the generated response.

10. The control method according to claim 2, wherein
the information processing apparatus is an image forming
apparatus that records an image of a recording medium
based on image data.

11. A non-transitory computer-readable medium storing a program executed by a computer with a plurality of network interfaces, the program, when executed by the computer, causing the computer to control to:
receive a request via one of the plurality of networks;
generate a response to a source of the received request, the response indicating the source of the request set as a destination address and a destination address of the request set as a source address;
send the response, only to the source of the received request, by a network interface determined based on a routing table in a case where the network interface determined based on the routing table to send the generated response matches a network interface by which the request has been received; and
discard the response not to send the generated response, only to the source of the received request, by the network interface determined based on the routing table in a case where the network interface determined based on the routing table to send the generated response does not match the network interface by which the request has been received.

* * * * *